United States Patent
Huang et al.

(10) Patent No.: US 7,158,849 B2
(45) Date of Patent: Jan. 2, 2007

(54) METHOD FOR RAPID PROTOTYPING BY USING LINEAR LIGHT AS SOURCES

(75) Inventors: Sheng-Jye Huang, Tainan (TW); Cheng-Chien Wang, Rende Township, Tainan Couny (TW); Sen-Yung Lee, Tainan (TW); Chuih-Kuan Wang, Tainan (TW); Chun-Shan Wang, Tainan (TW); Chuh-Yung Chen, Tainan (TW); Chieh-Li Chen, Tainan (TW); Wei-Siang Lai, Tainan (TW); Chen Hsieh, Tainan (TW); Tzong-Shing Leu, Tainan (TW); Chun-I Cheng, Jiading Township, Kaohsiung County (TW)

(73) Assignee: National Cheng Kung University, Tainan (TW)

( * ) Notice: Subject to any disclaimer, the term of this patent is extended or adjusted under 35 U.S.C. 154(b) by 0 days.

(21) Appl. No.: 10/974,744

(22) Filed: Oct. 28, 2004

(65) Prior Publication Data
US 2006/0100734 A1   May 11, 2006

(51) Int. Cl.
  *G06F 19/00* (2006.01)
  *B29C 35/04* (2006.01)
(52) U.S. Cl. .................. 700/119; 700/123; 264/401

(58) Field of Classification Search .............. 700/119, 700/123; 264/401
See application file for complete search history.

(56) References Cited

U.S. PATENT DOCUMENTS 6,051,179 A *  4/2000  Hagenau ............. 264/401
6,940,570 B1 *  9/2005  Sumida et al. ............. 349/61

OTHER PUBLICATIONS

"128×128 analog liquid crystal spatial light modulator"—Serati, Steven A et al—Smithsonian/NASA ADS Physics Abstract Archive, SPIE Mar. 1995.*

* cited by examiner

Primary Examiner—Michael D. Masinick
(74) Attorney, Agent, or Firm—Rosenberg, Klein & Lee

(57) ABSTRACT

A method for rapid prototyping by using linear light as sources employs DLP (Radiation Hardening Formation) or LCD, together with the portable devices and linear light source to treat the raw material in two stages. The first stage is to spread the raw material to a selected zone by nozzles or rollers and illuminating the material to let the material being processed and have physical o mechanical changes. The second stage is to use more powerful linear light source with the cooperation of the portable DMD (Digital Micromirror Device) or LCD (Liquid Crystal Display) to illuminate the material to make it have a second times of physical o mechanical changes. By the piling up the layers of the material, a complete 3-D work piece is obtained.

6 Claims, 18 Drawing Sheets

METHOD FOR RAPID PROTOTYPING BY USING LINEAR LIGHT AS SOURCES

FIELD OF THE INVENTION

The present invention relates to a method for rapid prototyping by using linear light as sources and piling layers of 2-D images to be a 3-D image.

BACKGROUND OF THE INVENTION

Typically, a complete process for developing a new product from design, making a prototype, management of production processes, mass production to introducing the product to the market, there always need a prototype for evaluation and examination. Thus, a prototype that is easily manufactured and amended is an important factor for a successful product. How to manufacture the prototype that meets needs is crucial for not spending too much manufacturing cost.

There are numerous methods available for prototype production such as the conventional manual production, CNC milling and carving machine. As for the conventional manual model production, except for experiences, it lacks precision. The CNC milling or carving machine are also confined to the types of chucks, bits or the size of the machine.

With the improvement in technologies, the quick growth of CAD package software has distinguishably shortened the development cycle for new products. For the past few years, the industry of Rapid Prototyping has well integrated with the CAD and production technologies and remarkably improves the efficiency for product design. The methods of quick formation can be classified as Layer Manufacturing, Automated Fabrication, Freeform Fabrication and Solid Imaging, etc. For the continuous development of past decades, there are ten more types of RP models available in the current markets. The methods of rapid formation can, according to the use of energy resources, be classified as Light Illuminating Processing, Stick-Formation processing and Complex Formation Processing. According to the documentary records, we classify the production process for rapid prototype making in terms of work piece properties, energy resources types, and stacking types. As shown in FIG. 1, some conventional production processes are as follows:

1. SLA (Radiation Hardening Formation): It is currently the most widely applied processing method with the formation by means of Stereolithography Formation. This production process is designed with He—Cd or Ar+ ultraviolet laser galvanometer-mirror to scan and illuminate the fluid polymers (light hardening resins). The resin required for formation becomes a thin film (around 0.15 mm~0.05 mm). Then, with the descending of Z-axis, the work piece zone is coated with a layer of liquid polymers. By using a scraper to destroy the surface tension of the liquid polymers a flat surface is obtained. The liquid polymer is then scanned by laser beams so that the layers are combined firmly. A 3-D solid work piece is obtained by repeating the previous steps. The flow chart of SLA (Radiation Hardening Formation) is shown in FIG. 2.

A U.S. Patent owned by 3D Systems, USA, filed on Aug. 8, 1984, issued on Mar. 11, 1986. The patent application dominates most of the market.

The shortcomings of the SLA are:
a. establishing support;
b. because of liquid resins, the material buckets must be completely filled so that the material cost will be high.

2. SLS: illuminating the hi-molecule resin powders by hi-power laser to sinter and the resins are melted and affix to the work pieces to form a thin layer. After that, the Z-axis of the machine descends and a new layer of powder is spread on the work piece by using a scraper. The outer layer is then sintered by the laser beams. By repeating the procedures, an overall 3-D solid work piece is obtained. The SLS flow chart is shown in FIG. 3.

The typical problems of the SLS are:
a. the powder cannot be spread evenly by using rollers or scrapers;
b. the powder needs a long period of time to be warmed which prolongs the working hours;
c. the powder easily causes flaying dust and potentially harmful to human health.
d. the powder is difficult to be heated evenly;
e. unavailable for the production of large work pieces.

3. FDM: the powder of work piece is pre-mixed with binder to form elongate stripes, the stripes are heated and melted and using nozzles to feed for production. The main defect of this method is that the surface of work piece is rough and requires support. The flow chart is shown in FIG. 4.

4. 3DP: it is also known as 3-D printing. This method establish a thin layer of powder and selectively sprays adhesive on the surface of powder by method of jetting such that the powder is affixed and form a thin layer on solid work pieces. By repeating the procedures, we can finish the production of 3-D solid work piece. The flow chart (shown as FIG. 5) of 3DP includes the problems as below:
a. Due to the formation is fully depended upon nozzles, the precision of nozzles is high.
b. It will come with inferior precision.
c. The materials of work pieces can only be porous items.
d. The powder cannot be spread with uniform densities.

5. LOM: The already-solidified thin layers are cut to some cross-sectional slices by laser and the layers are connected by binder. By this method, the molecules within the material layers are well linked. Before production, each layer of material must be prepared individually, resulting in complex operation procedures. Furthermore, the largest defect of this process is that the removal of reside materials is quite difficult.

6. OBJet: OBJet is also a type of 3-D printing process. The OBJet is designed with 2 different types of materials. One type of the materials is the material to create the 3-D solid work pieces and the other type of material is used as support for the models of work pieces. With the OBJet method, the nozzles are filled with two different types of materials and then use the ultraviolet radiation to make maturity of the materials of work pieces and the strength will be also enhanced. The materials used as support finally becomes gel type substance. By repeating the foresaid procedures, we can finish the a 3-D solid work piece.

The OBJet production process is featured with the advantages like high quality, high precision, cleansing and speedy operation. However, within the production process, the most important component is the nozzle. If the nozzle control is inferior, the precision of finished products will be much more defective. The nozzle of high precision is quite expensive but results in frequent congestion and this situation will significantly affect to cause much production cost.

7. The conventional DLP (Radiation Hardening Formation): DLP is also a type of stereolithography process and the differences compared with SLA are that the SLA is meant to harden the resin by use of a laser. Because the laser beams are thin and liner laser beams, thus, it will prolong the production process. Also, the cost for using a laser as ignition resource is high. DLP (Radiation Hardening Formation) is radiated with the light radiated from halides and it is further controlled by DMD (Digital Micromirror Device) for the hardening radiation directly onto the resins. Because the light sources of DLP are able to illuminate a certain zone, it can significantly shorten the working hours. The DLP production process is controlled by DMD for precise processing. Currently, the resolution can reach 1280*1024; namely, the common difference can be reduced within+/−0.005 inch.

The DLP uses a single material. When the product is formed by means of DLP, the material is hardened by light illuminating. As the working platform is descended, the hardened materials is covered by a layer of unhardened materials. By repeating the foresaid procedures, we can finish a 3-D solid work piece. The major problems happening to DLP are:

1. Because of the preparation for fluid materials, the material bucket for work piece must be completely filled. Thus, it causes high material consumption and cost.

2. The precision is entirely controlled by DMD. Thus, the high precision of DMD is extremely required so that it will directly cause higher production cost.

3. The process is thoroughly triggered by light sources so that light isolation becomes critically important. Also, the DMD is available for provision of low density light and it is quite sensitive to the ambient light sources. Thus, the material buckets are also vulnerable for light reaction to cause the increasing difficulty for material storage.

4. When creating some work pieces, additional supports are required.

5. Due to the large illumination area, if the intensity of light sources is not high enough, the material cannot react as desired.

The processing flow chart of DLP is shown in FIG. 6 to 8.

Beside the seven types of technologies, hereby, another Rapid Prototype Methods proposed by Hwahsing Tang is introduced in 2001. This method is especially meant for the creation of 3-D ceramic work pieces. Firstly, the inorganic binder and dissolving agent will be added into the ceramic powder. These materials will be formed into a composite with plasticity. Thereafter, the composite will be placed with a thin layer and the layer is subsequently heated to harden the materials. At this moment, due to the moisture decrement of inorganic binders when it is hardened to cause higher density and affixation, it will result in slightly inferior intensity. As for the substance property, it acts like the dried slur from the sintered ceramic materials. Following that, laser beams are used to sinter the selected zone for the secondary hardening process. At this moment, the hardening is well affixed by the sintering of ceramic powder. The strength is far beyond the hardened parts merely through dehydration. Thus, the inventor can select an adequate method to separate the substances from the materials with two hardness degrees. However, this production process is mainly applied to the production of ceramic work pieces to perform the relevant ceramic slur technologies. It is actually not suitable for the rapid prototyping general work pieces.

SUMMARY OF THE INVENTION

The present invention relates to a method for rapid prototyping by using linear light as sources. The method divides a 3-D image designed by CAD into a plurality of 2-D areas which are overlapped onto each other to form the 3-D image. The method comprises the following steps:

(1) putting raw material onto a defined zone;

(2) illuminating the raw materials a first time to cause a first physical or chemical change therein, so as to make the raw material into a gel-form substance;

(3) using more powerful linear light source with cooperation of a portable Digital Micromirror Device (DMD) to scan the selected zones of the material to cause a 2nd physical or chemical change thereto;

(4) repeating pre-set times of the step (1) to (3) and establishing connection between layers of the 2-D images; and (5) removing the material with the first change from the material with 2nd change so as to obtain a solid work piece.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
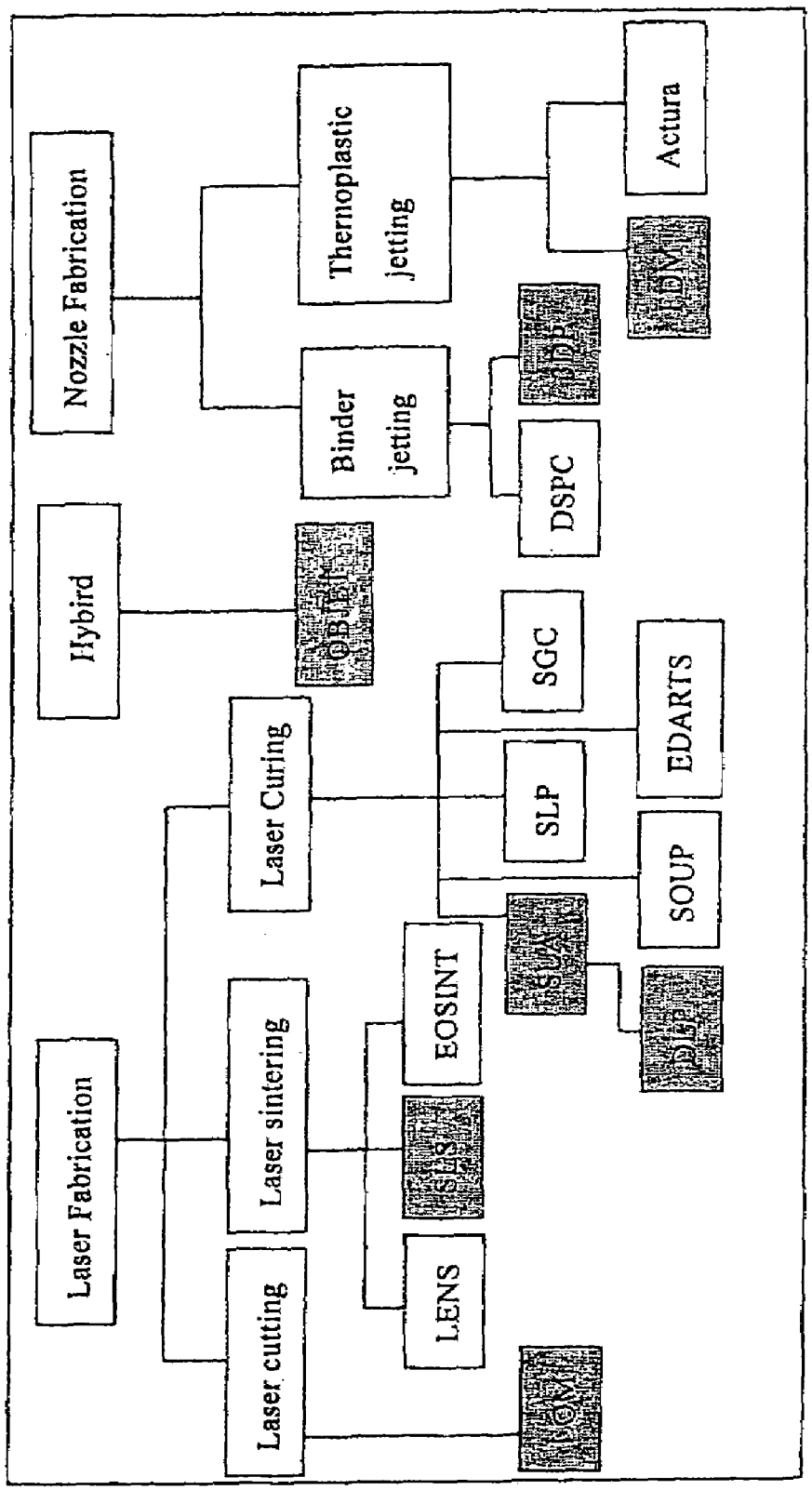
FIG. 1 shows the classification of rapid prototyping.
Figure 2:
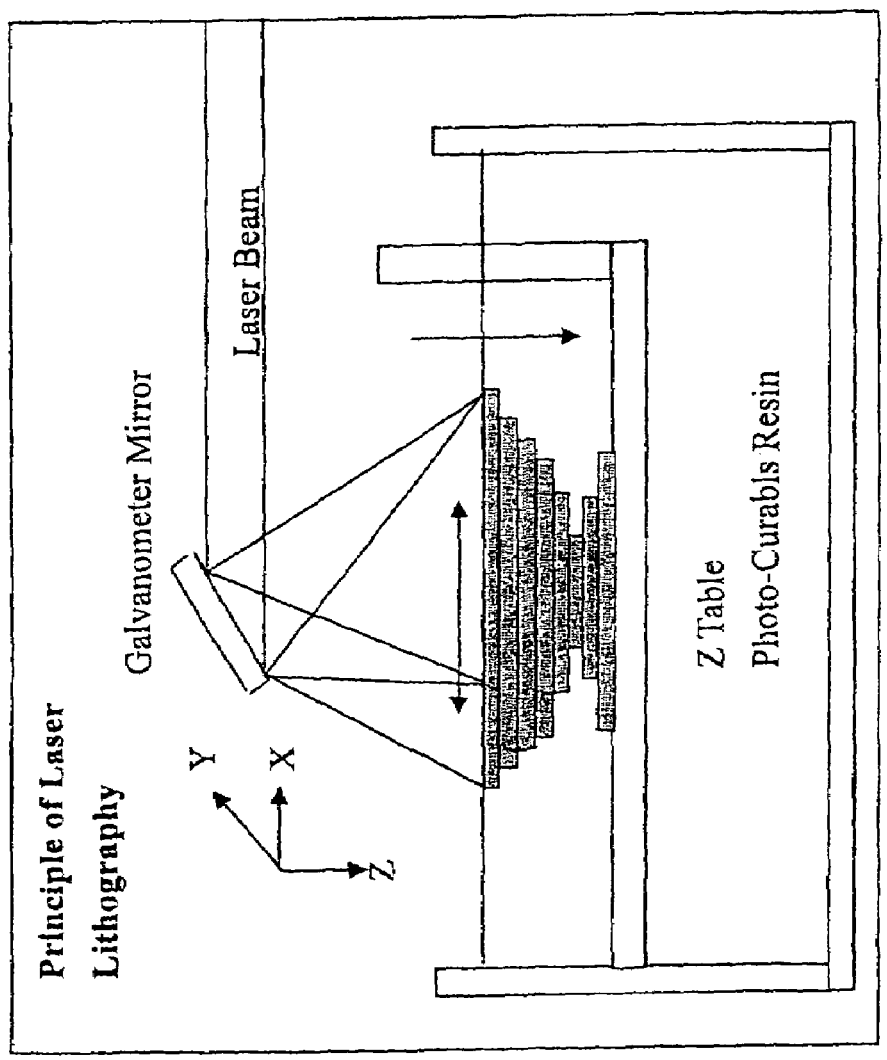
FIG. 2 is a flow chart of SLA.
Figure 3:
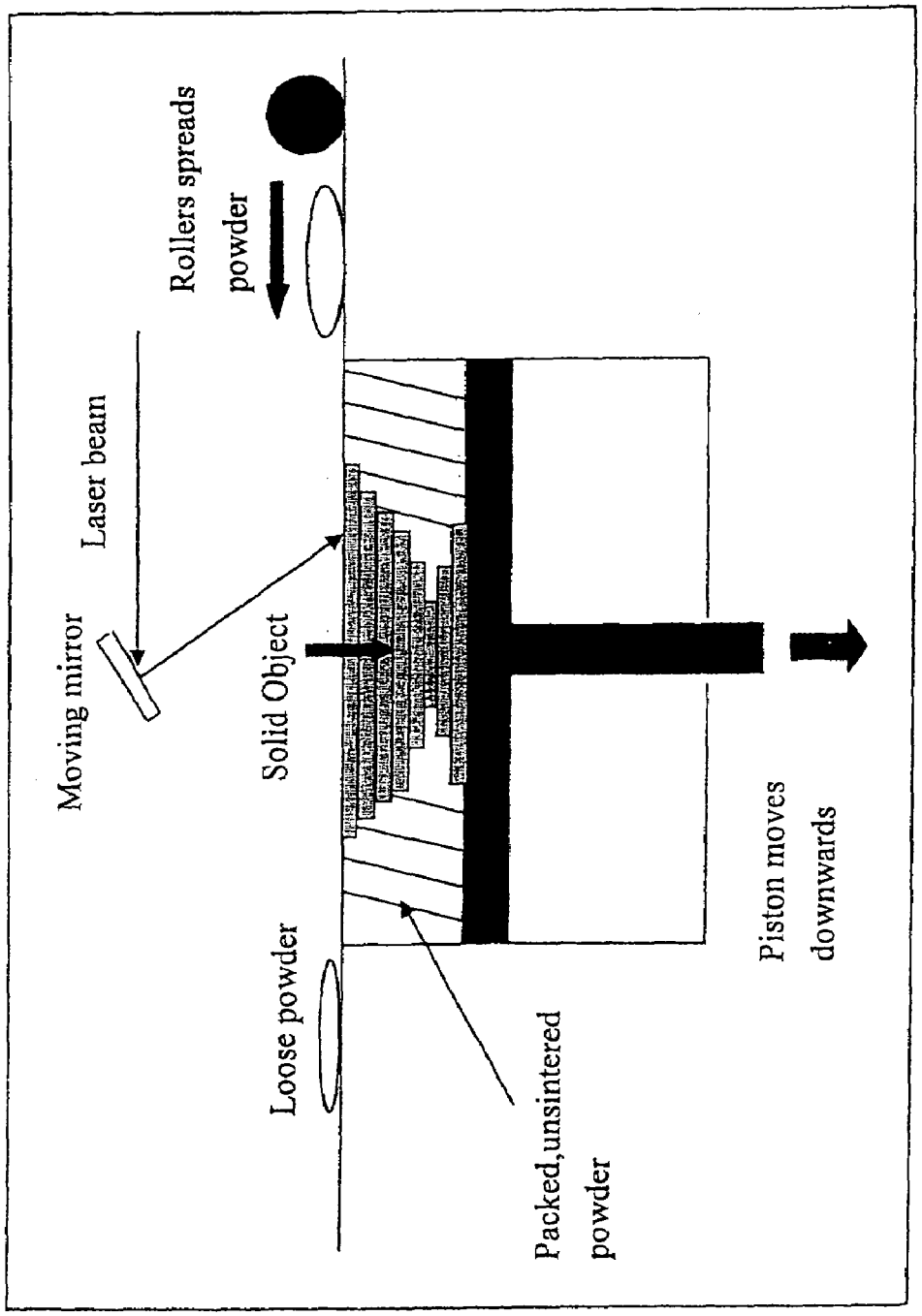
FIG. 3 is a flow chart of SLS.
Figure 4:
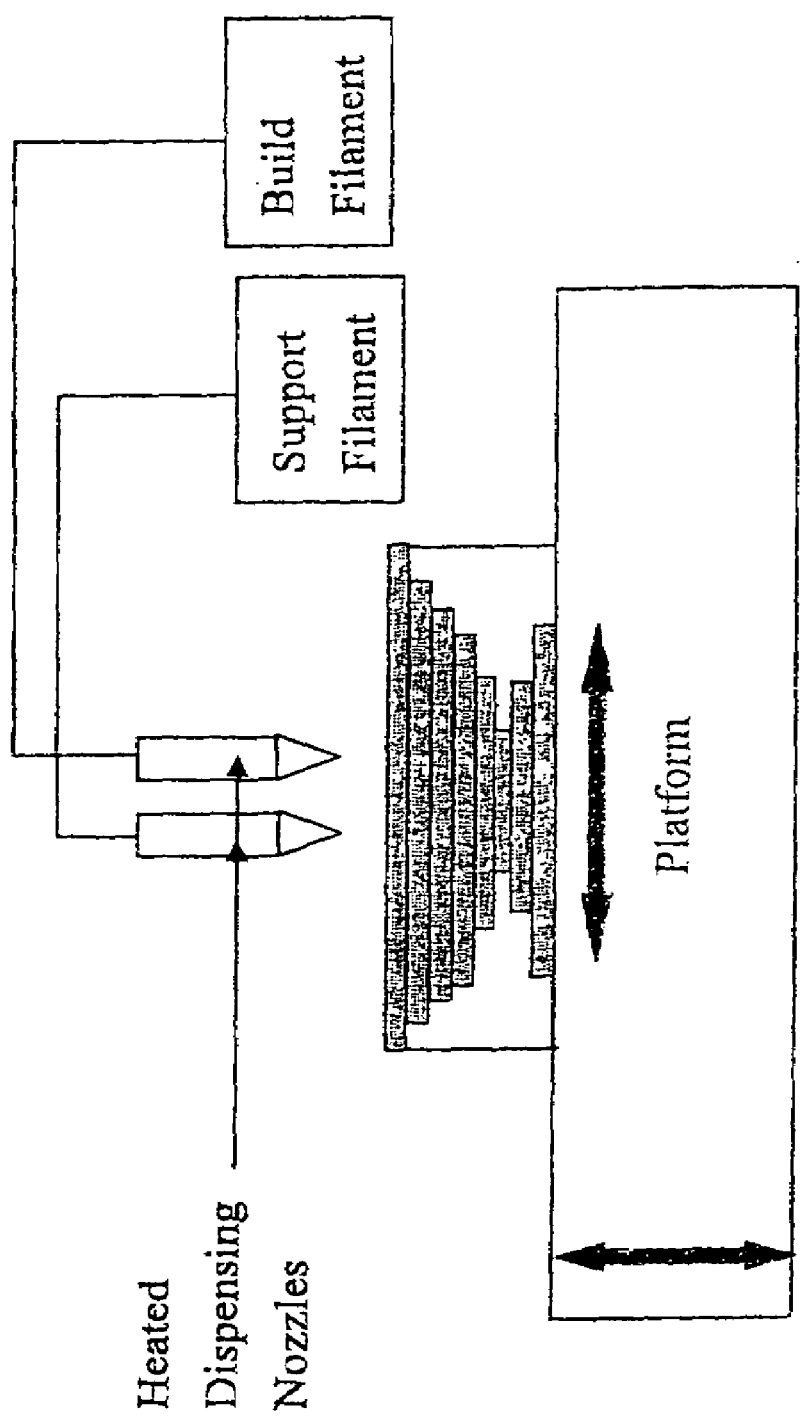
FIG. 4 is a flow chart of FDM.
Figure 5:
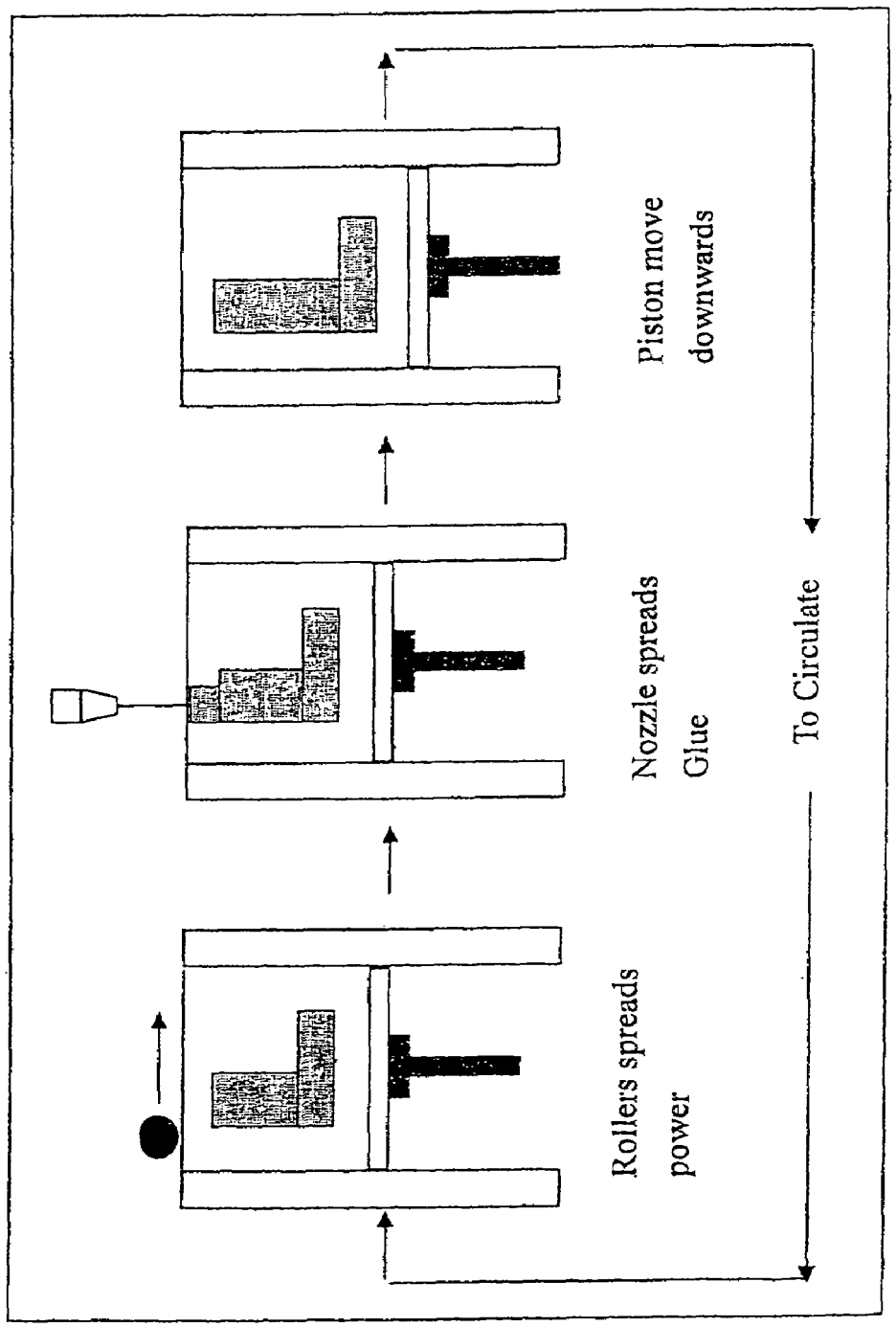
FIG. 5 is a flow chart of 3DP.
Figure 6:
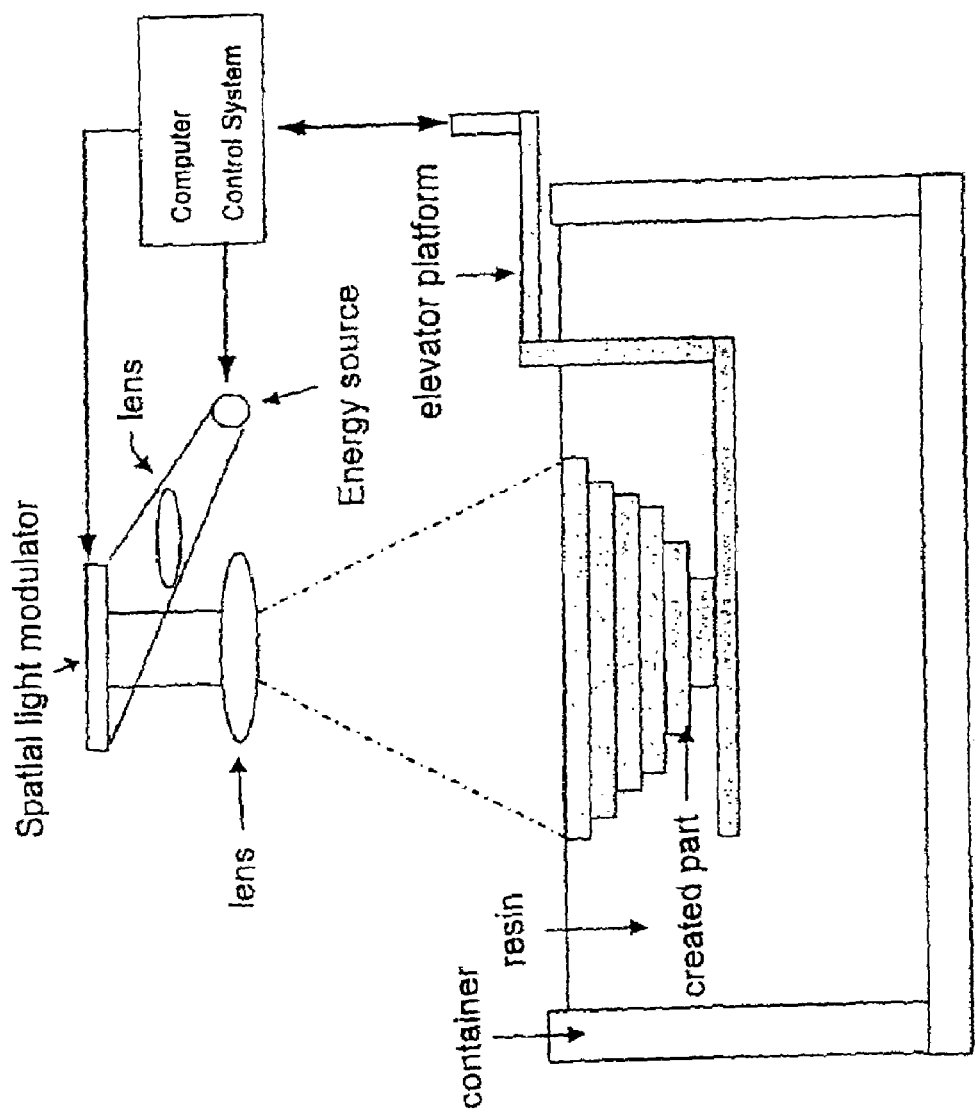
FIG. 6 is a flow chart of Type 1 of DLP.
Figure 7:
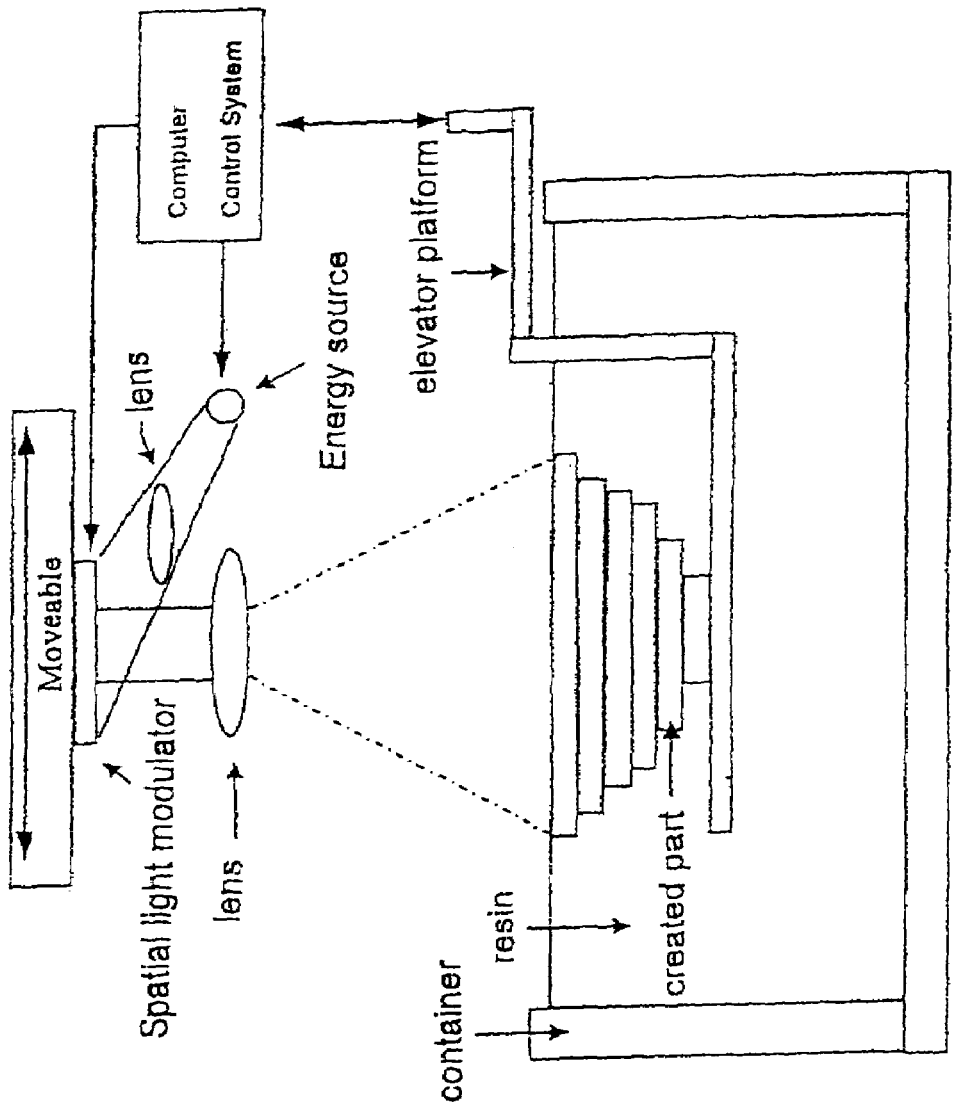
FIG. 7 is a flow chart of Type 2 of DLP.
Figure 8:
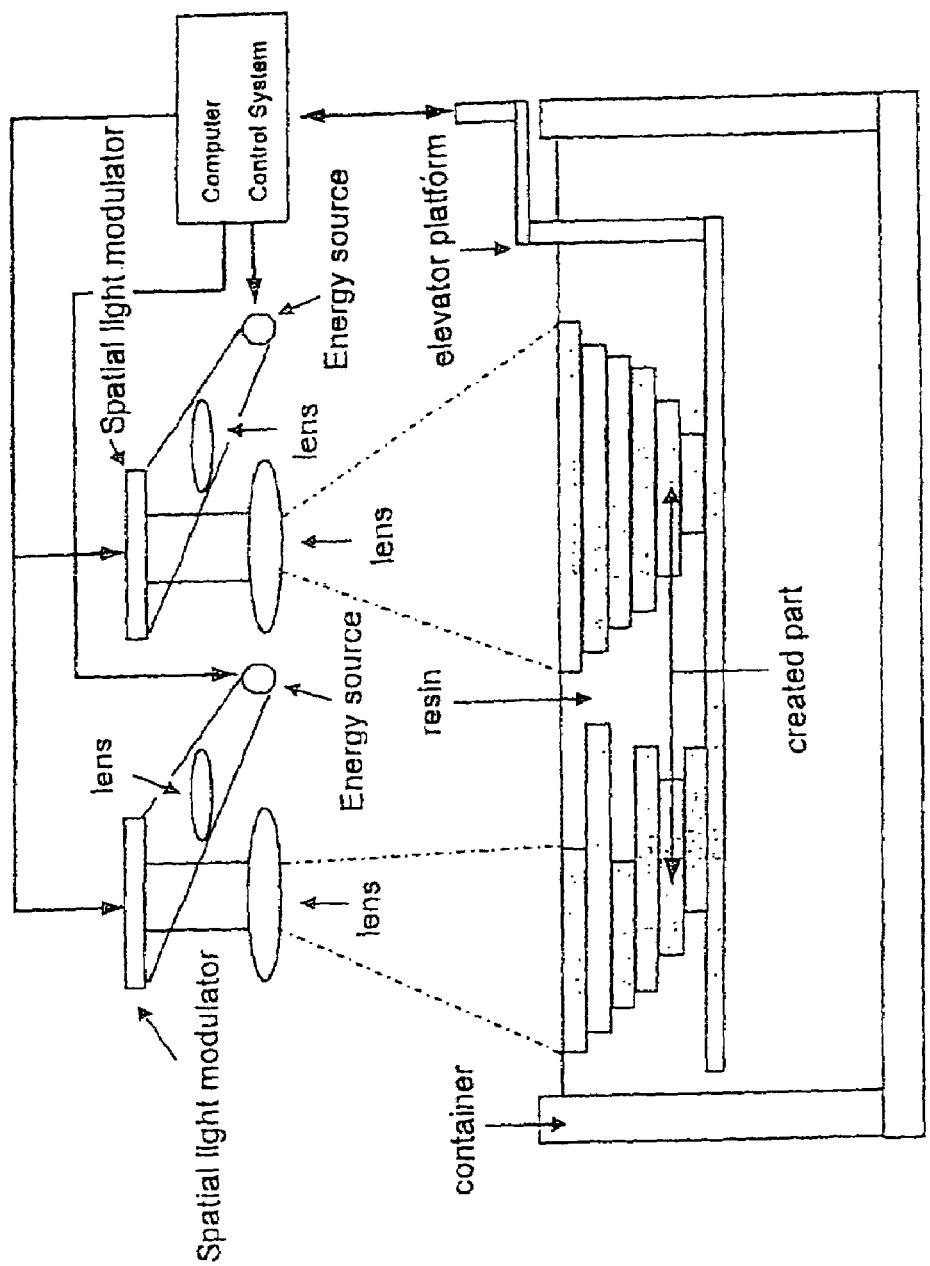
FIG. 8 is a flow chart of Type 3 of DLP.
Figure 9:
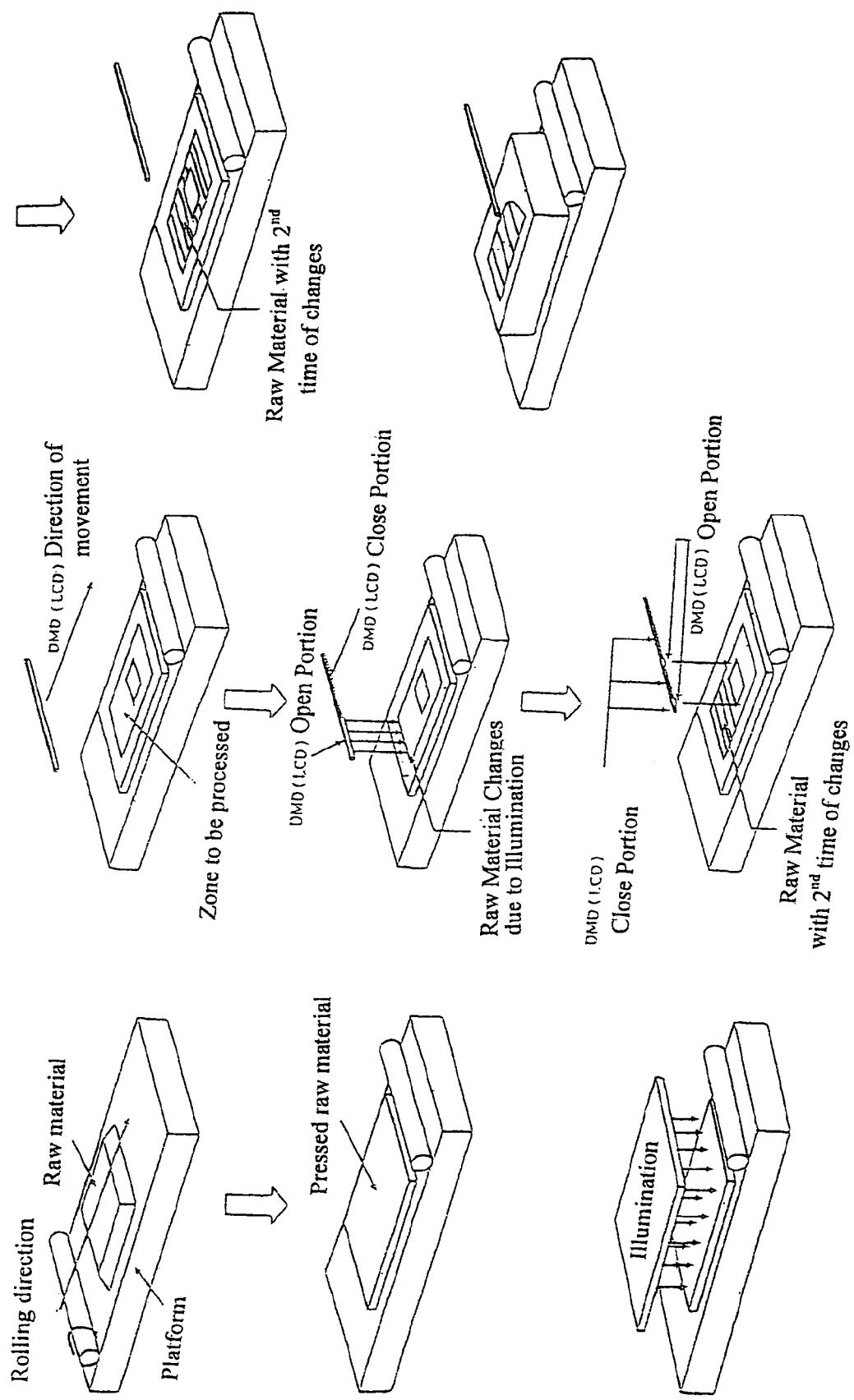
FIG. 9 is a flow chart of the method of rapid prototyping of the present invention.

Referring to FIG. 9, the method for rapid prototyping of the present invention comprises the following steps:

(1) preparing raw material onto a defined zone by using rolling, nozzles spreading, or by spreading the raw material and then rolling to obtain an even and thin layer of material with flat surface;

(2) illuminating the raw materials by light source, electronic beams, or heating to cause a first time of physical or chemical changes;

(3) using more powerful linear light source with cooperation of portable Digital Micromirror Device (DMD) to scan the selected zones of the material to cause a second time of physical or chemical changes;

(4) repeating pre-set times of the step (1) to (3) and removing the material without the second time of change by proper methods so as to obtain a solid work piece.

Figure 10:
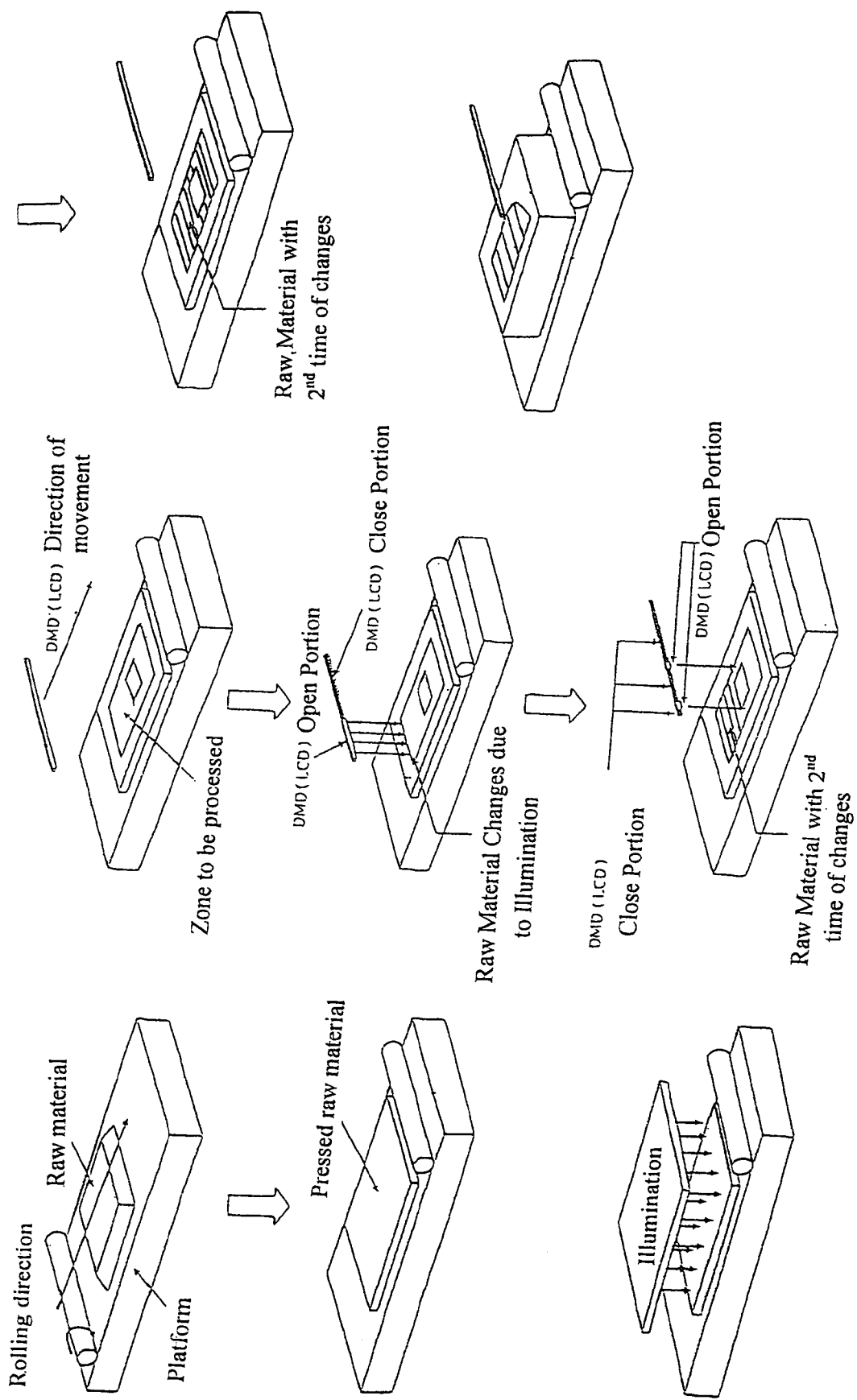
FIG. 10 is a flow chart of the first embodiment of the method of rapid prototyping of the present invention.

As shown in FIG. 10, the first embodiment of the method of rapid prototyping of the present invention includes the following steps;

(1) rolling raw material onto a defined zone;

(2) illuminating the raw materials cause a first time of physical or chemical changes;

(3) using more powerful linear light source with cooperation of portable Digital Micromirror Device (DMD) to scan the selected zones of the material to cause a second time of physical or chemical changes;

(4) repeating pre-set times of the step (1) to (3) and establishing connection between layers of the 2-D images;

(5) removing the raw material from the object with the second time of change so as to obtain a solid work piece.

Figure 11:
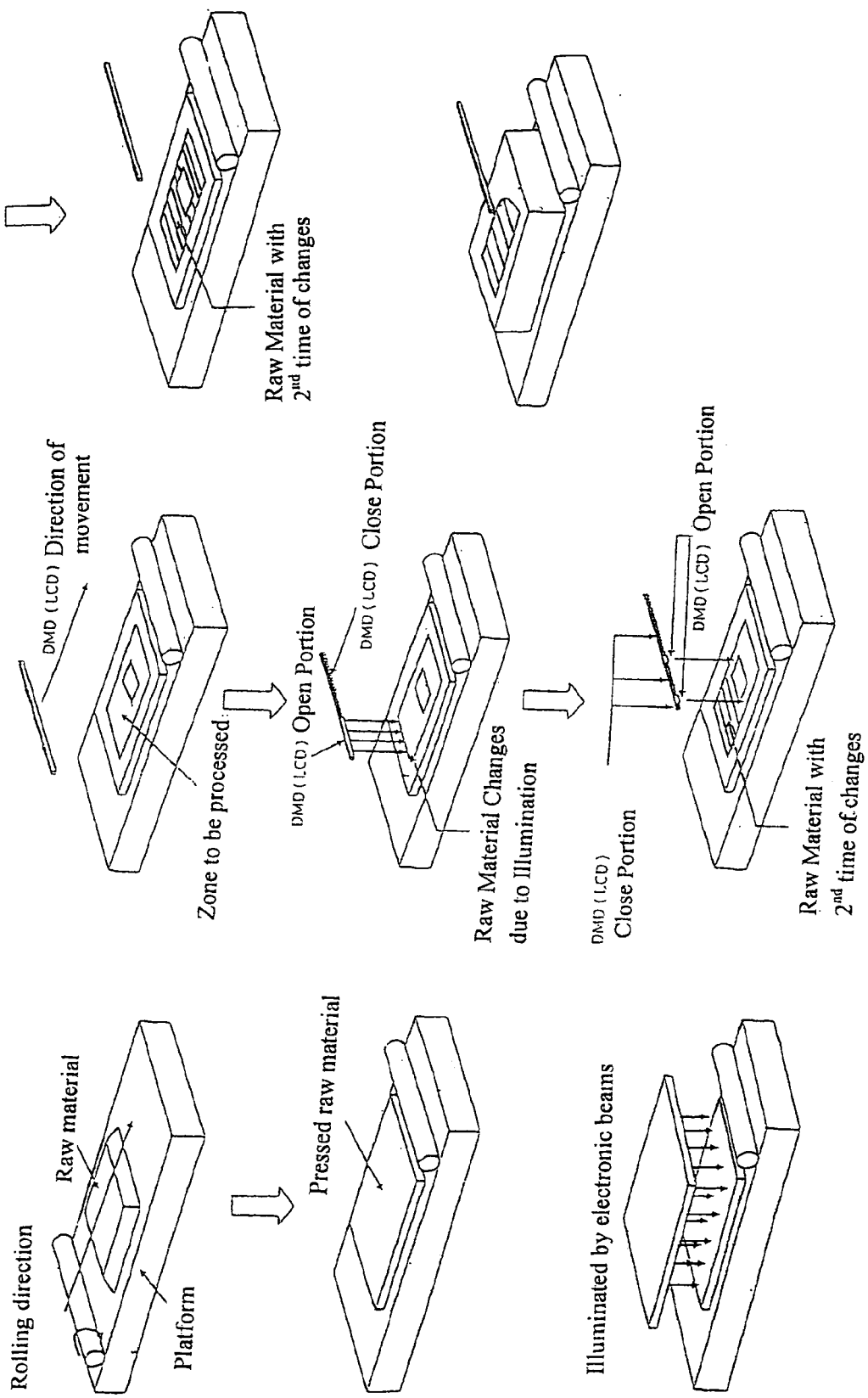
FIG. 11 is a flow chart of the second embodiment of the method of rapid prototyping of the present invention.

As shown in FIG. 11, the second embodiment of the method of rapid prototyping of the present invention includes the following steps;

(1) rolling raw material onto a defined zone;

(2) illuminating the raw materials by electronic beams to cause a first time of physical or chemical changes;

(3) using more powerful linear light source with cooperation of portable Digital Micromirror Device (DMD) to scan the selected zones of the material to cause a second time of physical or chemical changes;

(4) repeating pre-set times of the step (1) to (3) and establishing connection between layers of the 2-D images;

(5) removing the raw material from the object with the second time of change so as to obtain a solid work piece.

Figure 12:
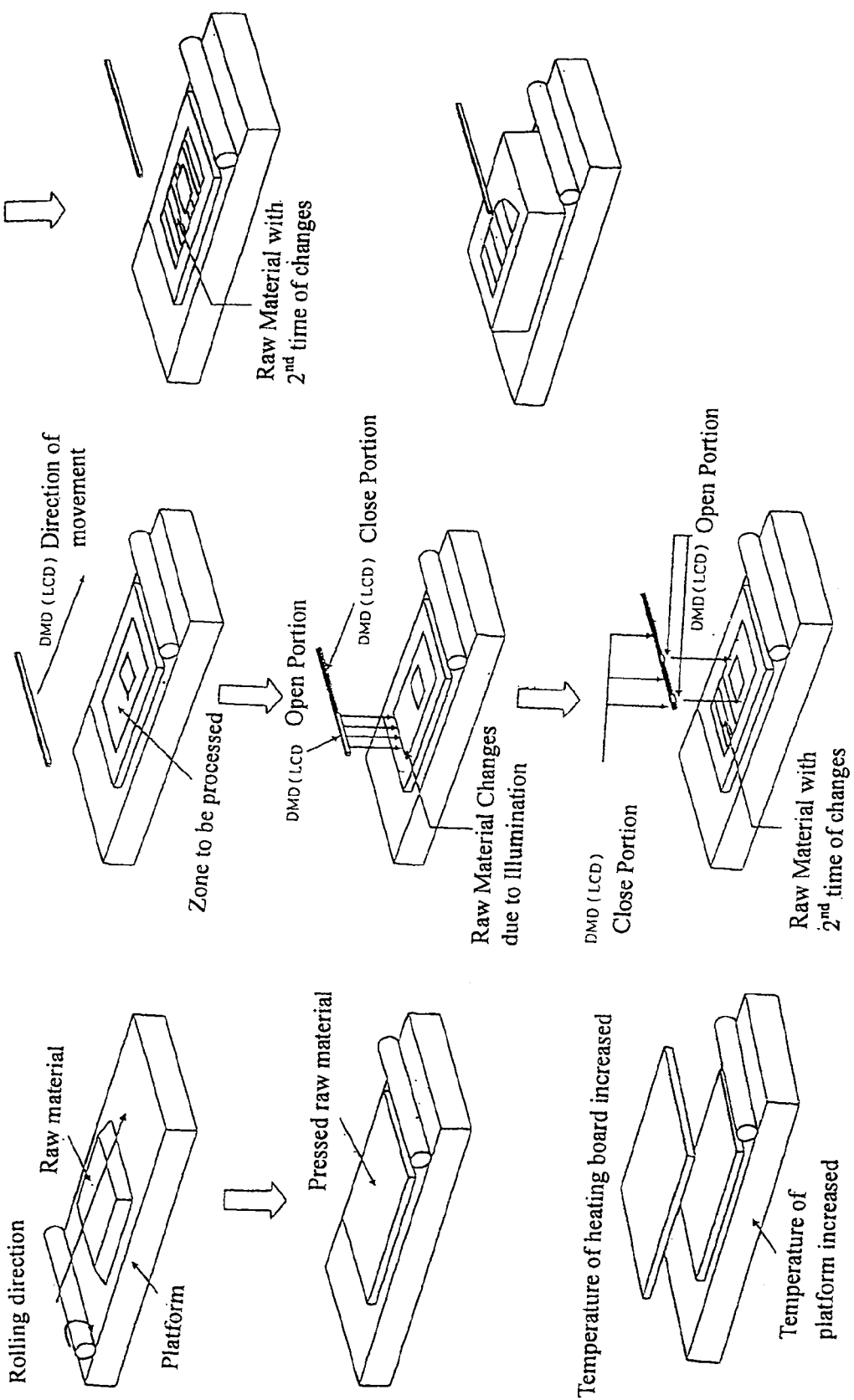
FIG. 12 is a flow chart of the third embodiment of the method of rapid prototyping of the present invention.

As shown in FIG. 12, the third embodiment of the method of rapid prototyping of the present invention includes the following steps;

(1) rolling raw material onto a defined zone;

(2) heating the raw materials to cause a first time of physical or chemical changes;

(3) using more powerful linear light source with cooperation of portable Digital Micromirror Device (DMD) to scan the selected zones of the material to cause a second time of physical or chemical changes;

(4) repeating pre-set times of the step (1) to (3) and establishing connection between layers of the 2-D images;

(5) removing the raw material from the object with the second time of change so as to obtain a solid work piece.

Figure 13:
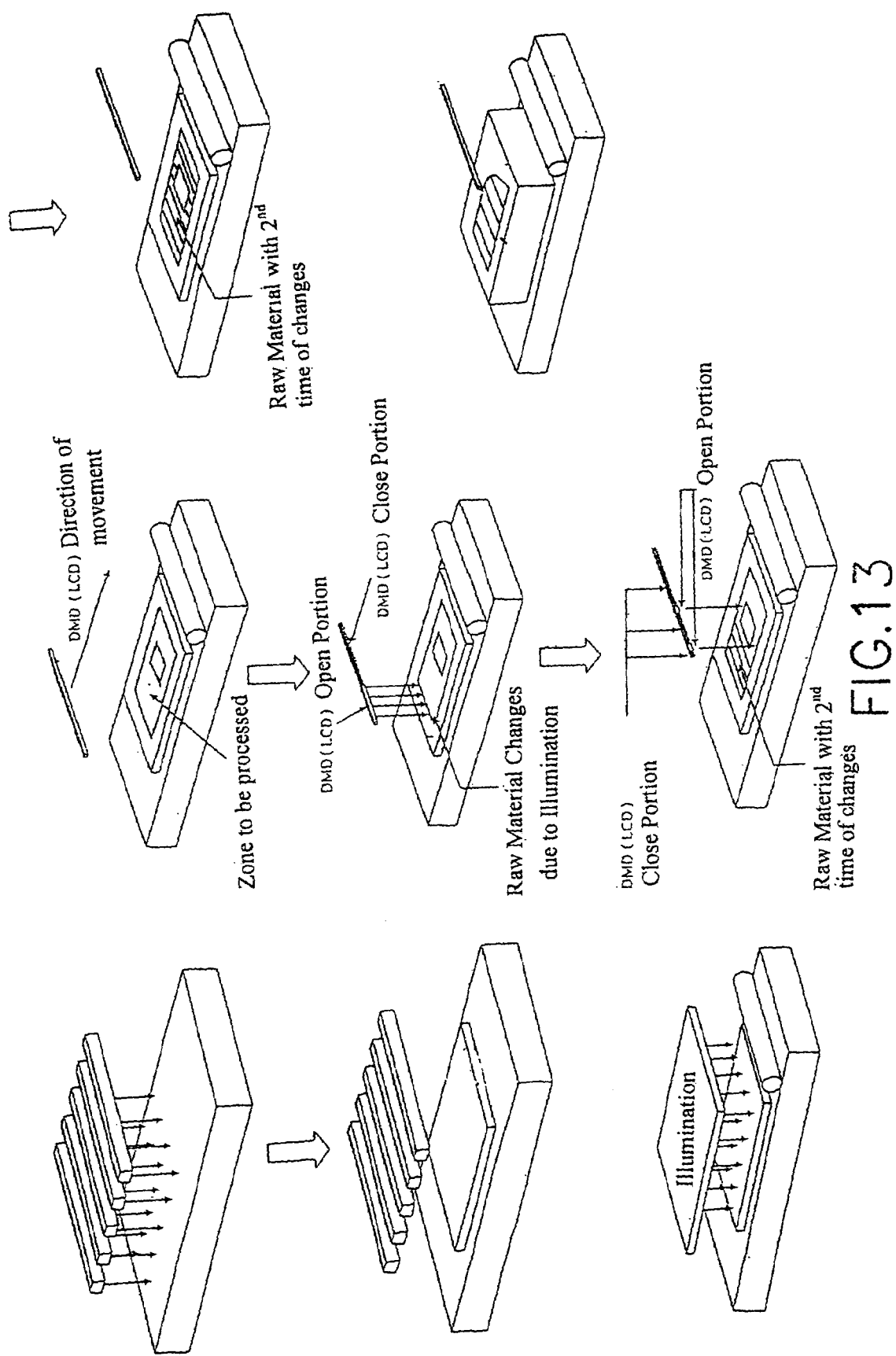
FIG. 13 is a flow chart of the fourth embodiment of the method of rapid prototyping of the present invention.

As shown in FIG. 13, the fourth embodiment of the method of rapid prototyping of the present invention includes the following steps;

(1) spreading raw material onto a defined zone by nozzles;

(2) illuminating the raw materials to cause a first time of physical or chemical changes;

(3) using more powerful linear light source with cooperation of portable Digital Micromirror Device (DMD) or Liquid Crystal Display (LCD) to scan the selected zones of the material to cause a second time of physical or chemical changes;

(4) repeating pre-set times of the step (1) to (3) and establishing connection between layers of the 2-D images;

(5) removing the raw material from the object with the second time of change so as to obtain a solid work piece.

Figure 14:
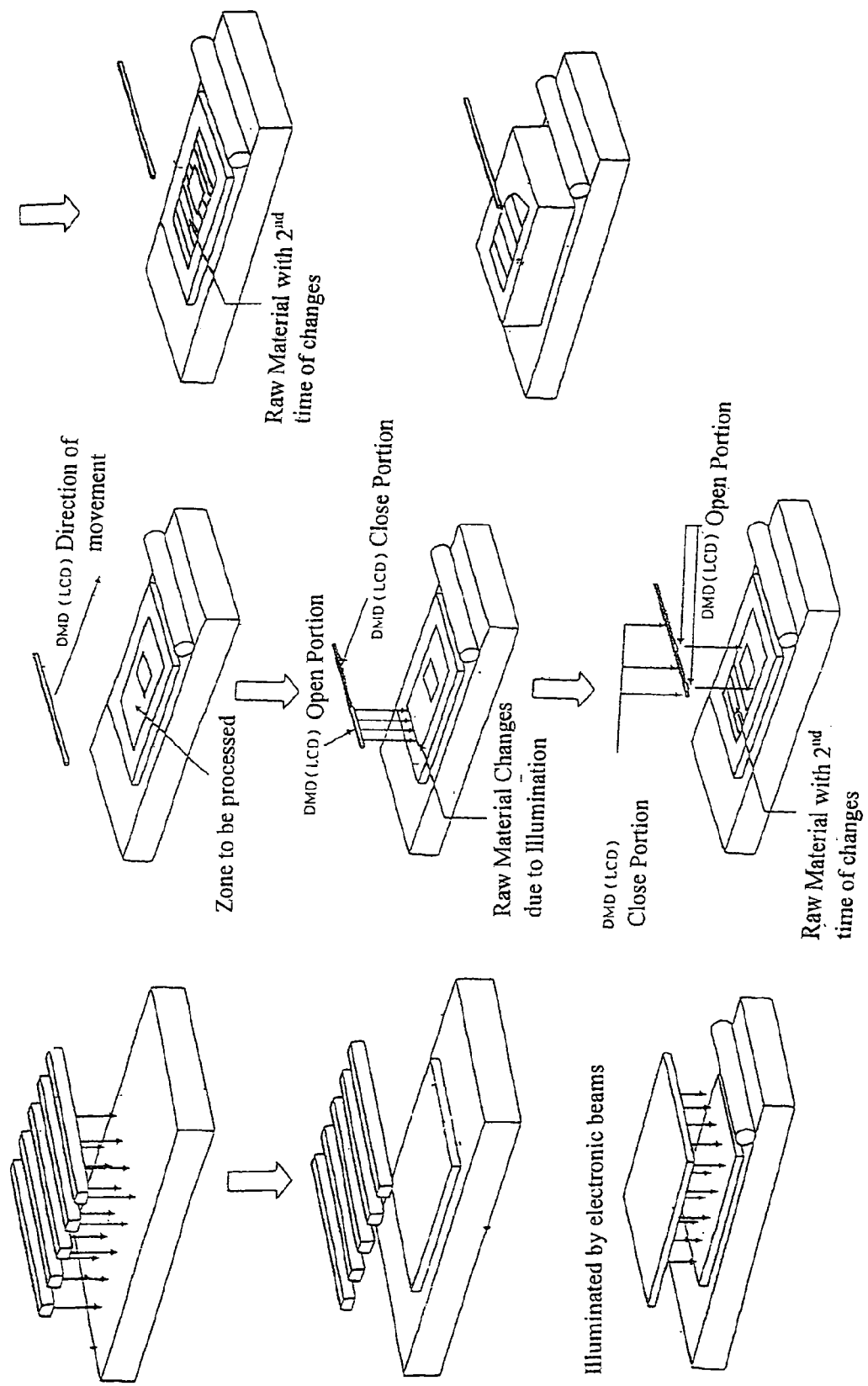
FIG. 14 is a flow chart of the fifth embodiment of the method of rapid prototyping of the present invention.

As shown in FIG. 14, the fifth embodiment of the method of rapid prototyping of the present invention includes the following steps;

(1) spreading raw material onto a defined zone by nozzles;

(2) illuminatin the raw materials by electronic beams to cause a first time of physical or chemical changes;

(3) using more powerful linear light source with cooperation of portable Digital Micromirror Device (DMD) or Liquid Crystal Display (LCD) to scan the selected zones of the material to cause a second time of physical or chemical changes;

(4) repeating pre-set times of the step (1) to (3) and establishing connection between layers of the 2-D images;

(5) removing the raw material from the object with the second time of change so as to obtain a solid work piece.

Figure 15:
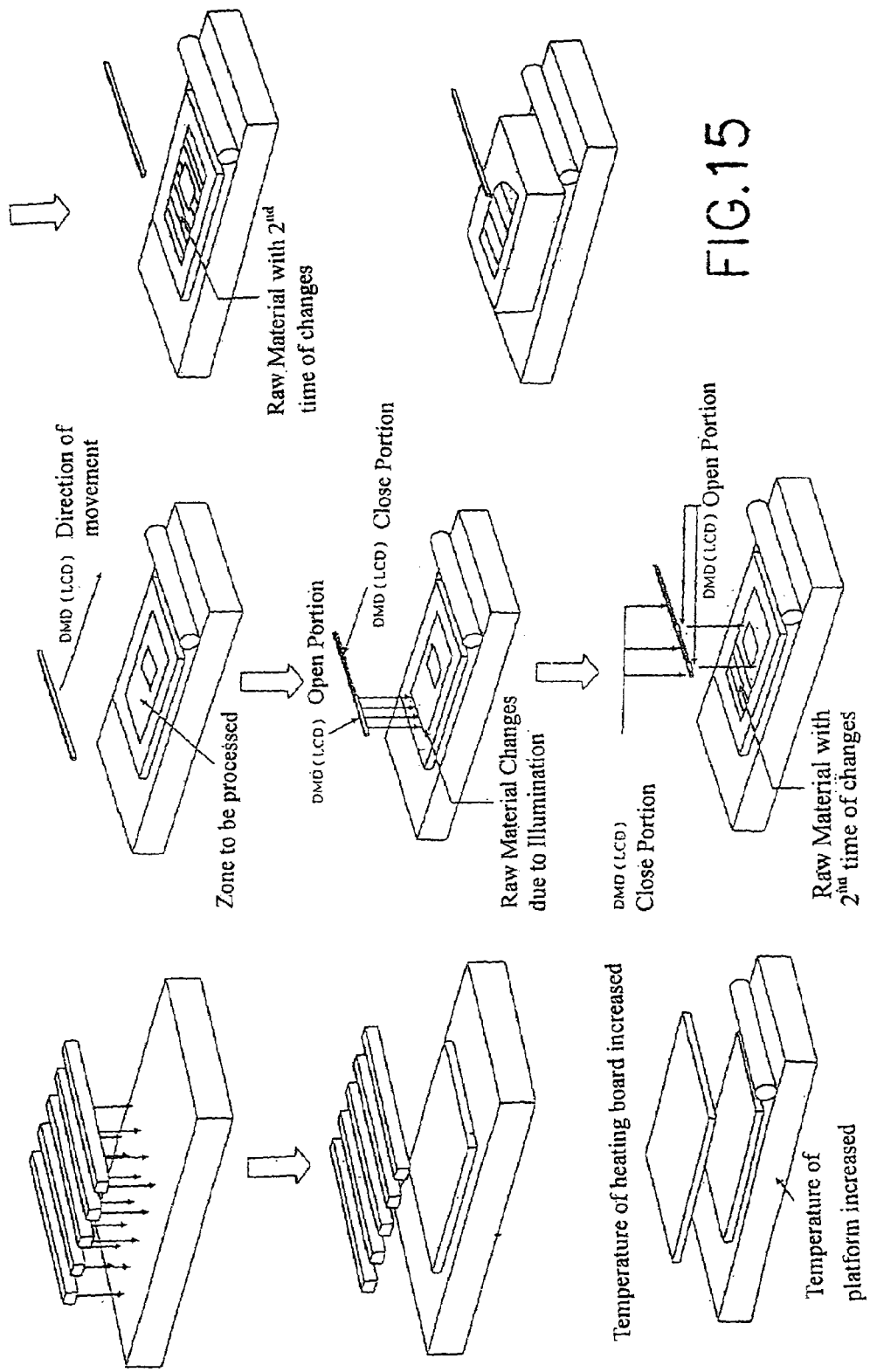
FIG. 15 is a flow chart of the six embodiment of the method of rapid prototyping of the present invention.

As shown in FIG. 15, the sixth embodiment of the method of rapid prototyping of the present invention includes the following steps;

(1) spreading raw material onto a defined zone by nozzles;

(2) heating the raw materials to cause a first time of physical or chemical changes;

(3) using more powerful linear light source with cooperation of portable Digital Micromirror Device (DMD) or Liquid Crystal Display (LCD) to scan the selected zones of the material to cause a second time of physical or chemical changes;

(4) repeating pre-set times of the step (1) to (3) and establishing connection between layers of the 2-D images;

(5) removing the raw material from the object with the second time of change so as to obtain a solid work piece.

Figure 16:
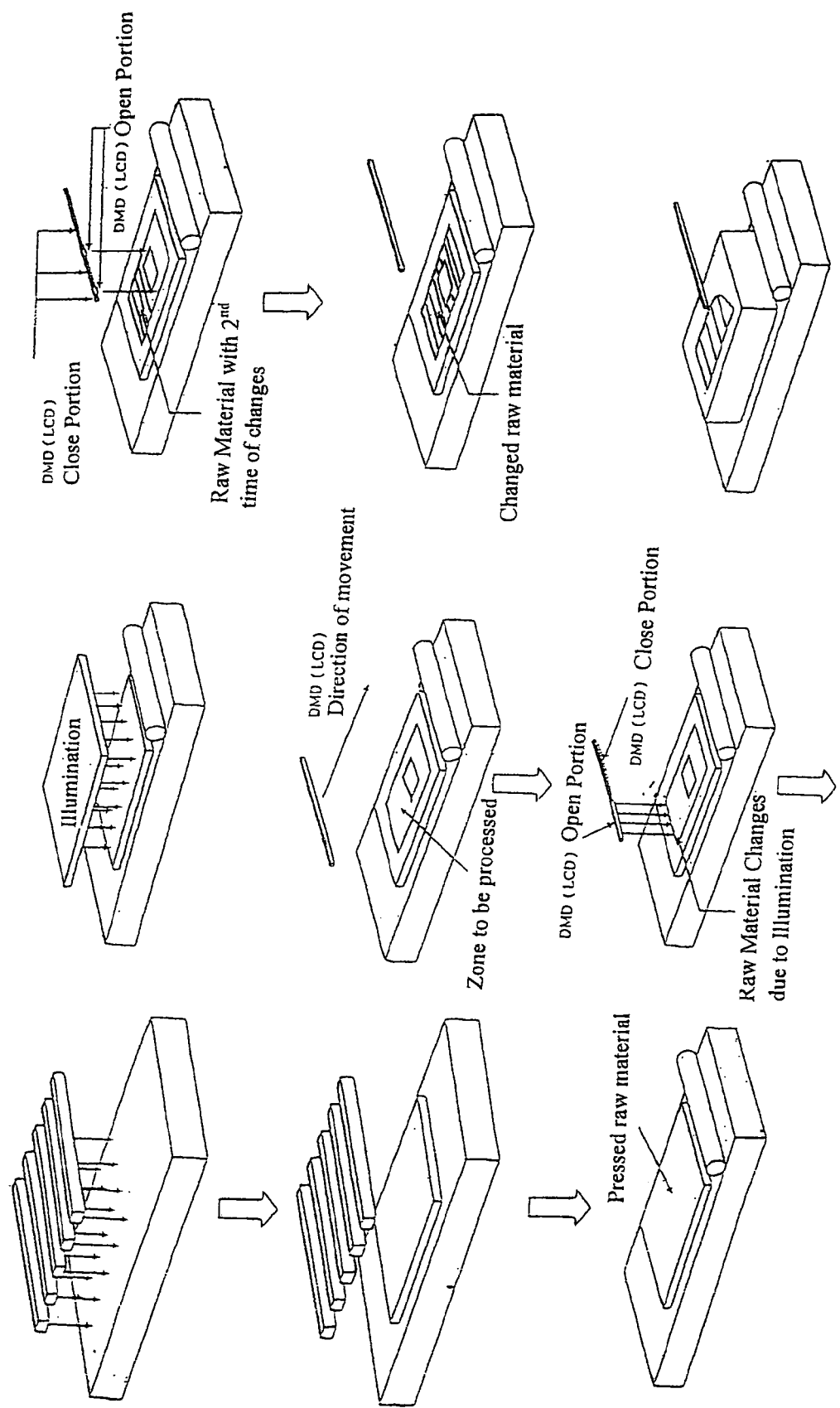
FIG. 16 is a flow chart of the seventh embodiment of the method of rapid prototyping of the present invention.

As shown in FIG. 16, the seventh embodiment of the method of rapid prototyping of the present invention includes the following steps;

(1) spreading raw material onto a defined zone by nozzles and rolling the material to have a flat surface;

(2) illuminatin the raw materials by electronic beams to cause a first time of physical or chemical changes;

(3) using more powerful linear light source with cooperation of portable Digital Micromirror Device (DMD) or Liquid Crystal Display (LCD) to scan the selected zones of the material to cause a second time of physical or chemical changes;

(4) repeating pre-set times of the step (1) to (3) and establishing connection between layers of the 2-D images;

(5) removing the raw material from the object with the second time of change so as to obtain a solid work piece.

Figure 17:
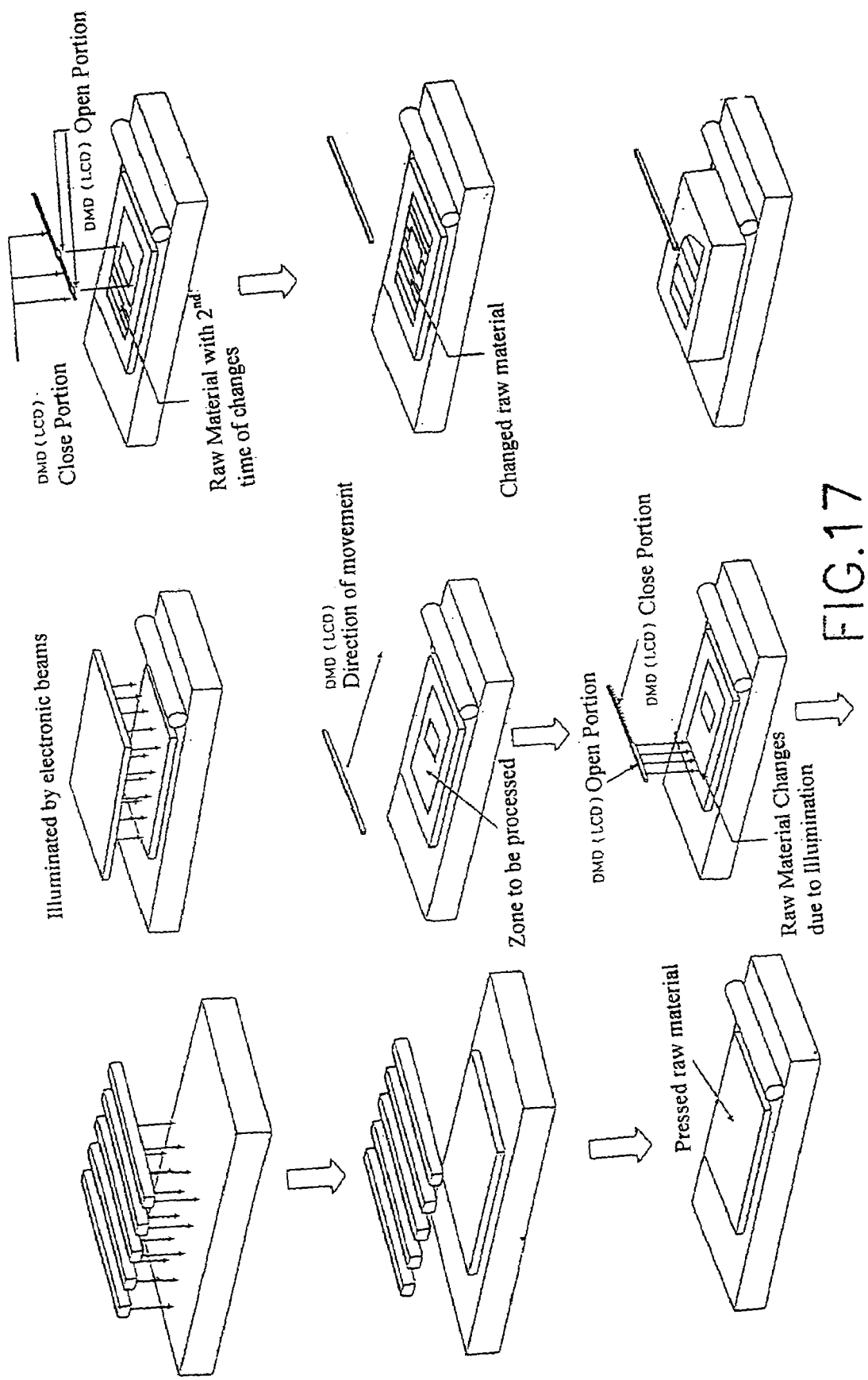
FIG. 17 is a flow chart of the eighth embodiment of the method of rapid prototyping of the present invention.

As shown in FIG. 17, the eighth embodiment of the method of rapid prototyping of the present invention includes the following steps;

(1) spreading raw material onto a defined zone by nozzles and rolling the material to have a flat surface;

(2) illuminatin the raw materials by electronic beams to cause a first time of physical or chemical changes;

(3) using more powerful linear light source with cooperation of portable Digital Micromirror Device (DMD) or Liquid Crystal Display (LCD) to scan the selected zones of the material to cause a second time of physical or chemical changes;

(4) repeating pre-set times of the step (1) to (3) and establishing connection between layers of the 2-D images;

(5) removing the raw material from the object with the second time of change so as to obtain a solid work piece.

Figure 18:
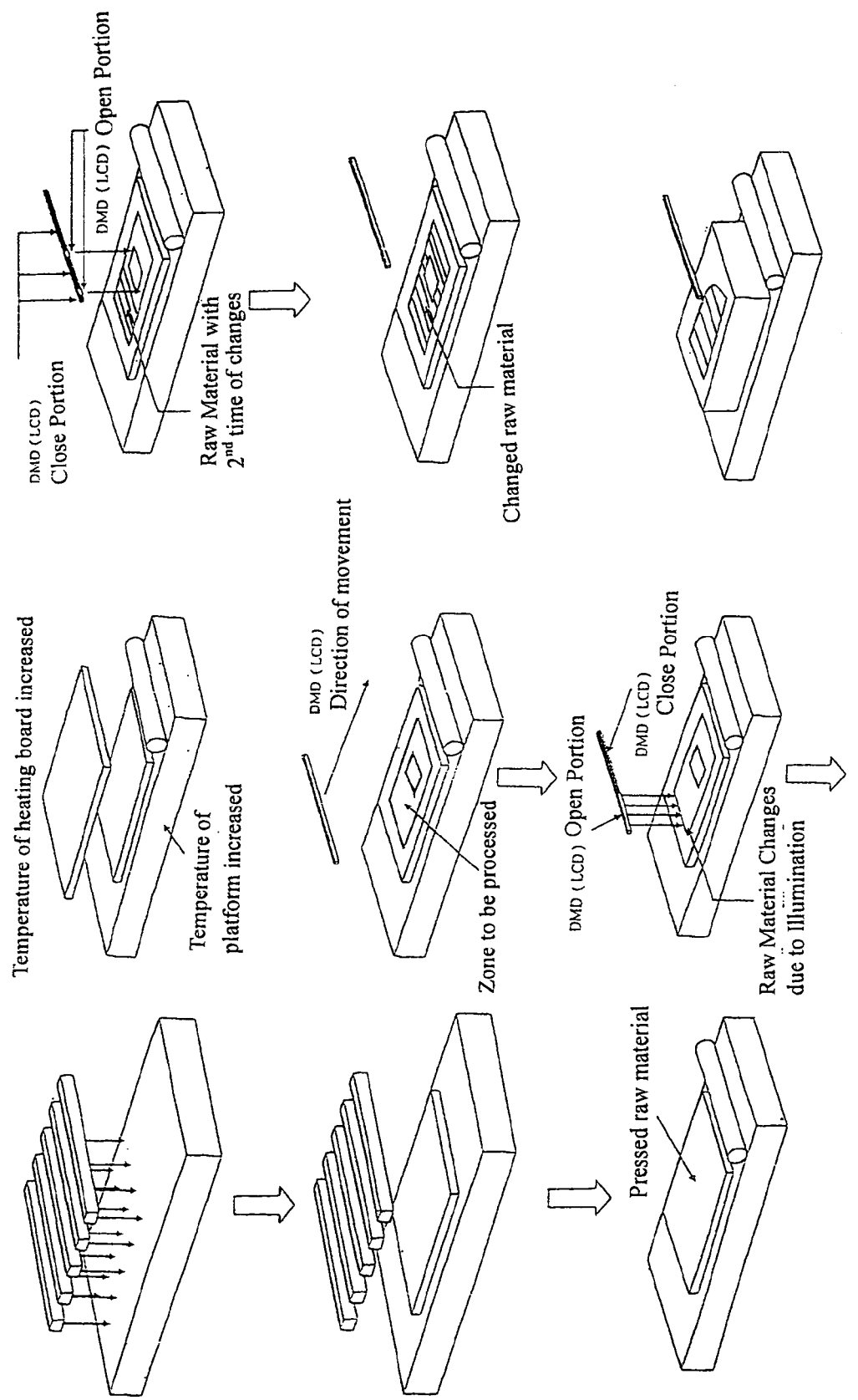
FIG. 18 is a flow chart of the ninth embodiment of the method of rapid prototyping of the present invention.

As shown in FIG. 18, the ninth embodiment of the method of rapid prototyping of the present invention includes the following steps;

(1) spreading raw material onto a defined zone by nozzles and rolling the material to have a flat surface;

(2) heating the raw materials to cause a first time of physical or chemical changes;

(3) using more powerful linear light source with cooperation of portable Digital Micromirror Device (DMD) or Liquid Crystal Display (LCD) to scan the selected zones of the material to cause a second time of physical or chemical changes;

(4) repeating pre-set times of the step (1) to (3) and establishing connection between layers of the 2-D images;

(5) removing the raw material from the object with the second time of change so as to obtain a solid work piece.

The material experienced two times of physical and chemical changes so as to have stronger mechanical features. In this method of the present invention, the material with weaker feature is supported by the material having stronger features and the two types of materials can be separated by proper methods. Therefore, the 3-D object can be obtained within a short period of time.

While we have shown and described the embodiment in accordance with the present invention, it should be clear to those skilled in the art that further embodiments may be made without departing from the scope of the present invention.

What is claimed is:

1. A method for rapid prototyping by using linear light as sources, the method comprising the following steps:
    (1) dividing a 3-D image into a plurality of 2-D images which when overlapped reproduce the 3-D image;
    (2) depositing a layer of a raw material onto a defined zone;
    (3) irradiating the deposited layer of the raw material with a first energy source to convert the entire raw material layer into a gel-form substance layer;
    (4) irradiating selected portions of the gel-form substance layer with a second energy source to solidify the irradiated portions of the gel-form substance layer, the second energy source being a linear light source, the selected portions of the gel-form substance layer being scanned in correspondence to a respective one of the plurality of 2-D images;
    (5) repeating steps (2) to (4) until each of the plurality of 2-D images have been scanned and establishing connection between each of the layers corresponding to the plurality of 2-D images; and
    (6) removing the gel-form material substance layer portions from the solidified portions to obtain a solid work piece.

2. The method as claimed in claim 1, wherein the step of depositing includes the step of spraying the raw material into the defined zone using nozzles.

3. The method as claimed in claim 2, wherein the step of spraying is followed by the step of rolling the sprayed layer of raw material.

4. The method as claimed in claim 1, wherein the raw material in step (3) is irradiated using electronic beams.

5. The method as claimed in claim 1, wherein the step of irradiating selected portions of the gel-form substance layer includes the step of scanning the selected portions of the gel-form substance layer using portable Liquid Crystal Display (LCD).

6. The method as claimed in claim 1, wherein the step of irradiating selected portions of the gel-form substance layer includes the step of scanning the selected portions of the gel-form substance layer using a portable Digital Micromirror Device (DMD).

* * * * *